United States Patent [19]

Johnson

[11] Patent Number: 5,111,127
[45] Date of Patent: May 5, 1992

[54] PORTABLE POWER SUPPLY

[76] Inventor: Woodward Johnson, 200 Bush Hill Rd., Ashburnham, Mass. 01430

[21] Appl. No.: 542,702

[22] Filed: Jun. 25, 1990

[51] Int. Cl.$^5$ .................. H01M 10/46; H02J 7/00
[52] U.S. Cl. .................................. 320/2; 320/15; 320/61
[58] Field of Search .................. 320/2, 61, 15

[56] References Cited

U.S. PATENT DOCUMENTS

| | | |
|---|---|---|
| 360,934 | 4/1887 | Waite . |
| 2,230,458 | 2/1941 | Hummert .................. 240/10.6 |
| 2,978,596 | 4/1961 | Robirds ........................ 320/2 |
| 3,510,745 | 5/1970 | Futterer ........................ 320/7 |
| 3,963,972 | 6/1976 | Todd ............................ 307/150 |
| 4,009,051 | 2/1977 | Kazis et al. ................. 320/15 X |
| 4,300,087 | 11/1981 | Meisner .................... 307/150 |
| 4,315,163 | 2/1982 | Bienville .................... 136/291 |
| 4,376,250 | 3/1983 | Baker, Jr. et al. ......... 307/150 |
| 4,392,661 | 7/1983 | Langenstein .............. 224/902 |
| 4,481,562 | 11/1984 | Hickson ..................... 136/244 |
| 4,786,851 | 11/1988 | Fuji et al. ................... 320/2 |
| 4,942,723 | 7/1990 | Wassell ..................... 320/61 X |

Primary Examiner—R. J. Hickey
Attorney, Agent, or Firm—John P. McGonagle

[57] ABSTRACT

A portable power supply having a rechargeable battery in a housing mounted on a portable frame. An inverter/converter unit, attached to the frame, is hardwired to the battery for conversion of DC power to AC power and for recharging the battery from an external AC source. Power distribution means are provided for distributing DC and AC Power. Photovoltaic panels are mounted to the frame for recharging the battery.

9 Claims, 5 Drawing Sheets

PORTABLE POWER SUPPLY

BACKGROUND OF THE INVENTION

The present invention relates in general to power supplies, and more particularly to a portable, self-contained, rechargeable, electrical power supply.

In the prior art, various devices have been used to provide a source of electrical power to locations without access to conventional power lines. One class of devices is based upon diesel and gasoline motor generators. The devices in this class are generally complicated, lack easy portability, and require an external source of fuel. Another class of devices is the vehicle inverter type and are adapted to be powered from the vehicle's storage battery. Since the device is fixed to a vehicle, it is inherently nonportable. Furthermore, any recharging capability for such devices is through the vehicle's internal combustion engine which requires operation to periodically charge the vehicle's battery. A third class of devices are rechargeable batteries. However, even those with appropriate current available are generally limited in the variety of outputs and loads which can be simultaneously handled and in how long the battery will function before recharging is required.

SUMMARY OF THE INVENTION

In view of the foregoing disadvantages inherent in the known types of devices now present in the prior art, the present invention provides an improved portable power supply. As such, the general purpose of the present invention, which will be described subsequently in greater detail, is to provide a new and improved power supply which is portable, has a self-contained recharging capability, provides both AC and DC outputs, and can handle a variety of loads simultaneously.

To attain this, the present invention utilizes one or more deep discharge type batteries contained in a housing attached to a wheeled frame. Mounted above the housing is an inverter attached to the battery and providing an AC output via conventional AC plugs. Photovoltaic panels are attached to the frame and wired to the batteries for continuous recharging. Switching means provide the capability of channeling power from the panels directly to a DC output plug or to the battery.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE PREFERRED EMBODIMENT

Figure 1:
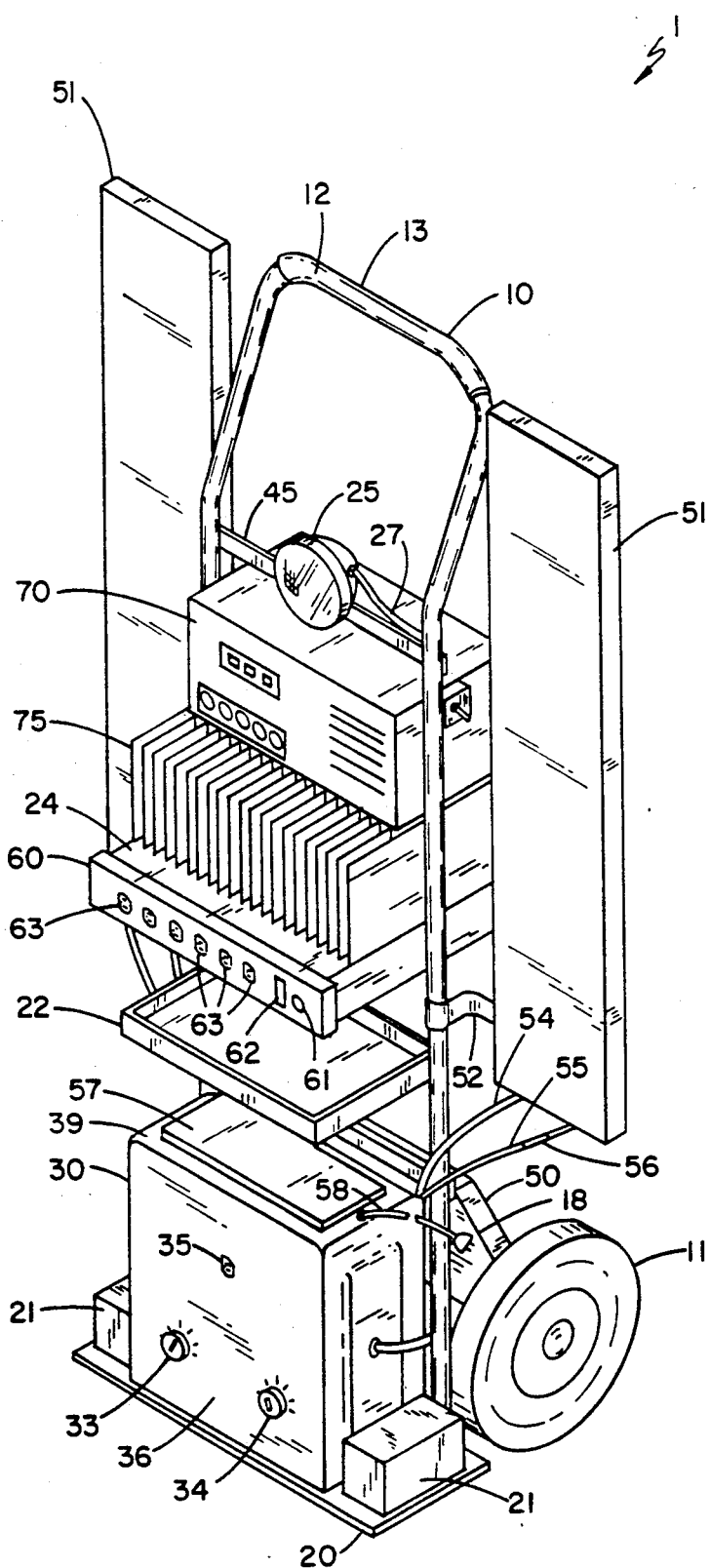
FIG. 1 is a front perspective view of the present invention.

Referring to the drawings in detail wherein like elements are indicated by like numerals, there is shown an embodiment of a portable power supply 1 constructed according to the present invention. The portable power supply 1 generally comprises an upright, dolly-shaped frame member 10 having two ground engaging wheels 11 for transporting the frame member 10 over the ground and a hand grip 12 for pushing or pulling the frame member 10. The frame member 10 has a top 13, a bottom 14, two sides 15, a front 16, and a back 17. The wheels 11 are axially joined to the frame member by means of a rearwardly extending brace 18 attached to the frame sides 15 near to the frame member bottom 14. The hand grip 12 is located at the frame top 13.

The frame member 10 contains a plastic housing box 30 resting on a shelf 20 attached near to the bottom 14 of the frame 10. Two small accessory boxes 21 are mounted to either side of the housing box 30 on the bottom shelf 20. Inside the housing box 30 there is a 12 volt, 93 amp hour, deep-cycle, permanently-sealed, marine DC battery 40 having positive 41 and negative 42 output poles. A 12 volt DC female plug 35 is externally mounted on the front 36 of the battery box 30 and is connected to a switch 34. This plug 35 provides DC output from the invention 1. The plug 35 contains an inline fuse 37 in one of its leads 38.

A small accessory shelf 22 is mounted to the frame 10 above the battery housing box 30. Above the accessory shelf 22 is a horizontal shelf 24 attached the frame 10. A six outlet AC power block 60 is attached to the front 23 of the horizontal shelf 24. A heat sink 75 and 1200 watt DC-to-AC/AC-to-DC inverter/converter unit 70 is mounted on the horizontal shelf 24.

Figure 2:
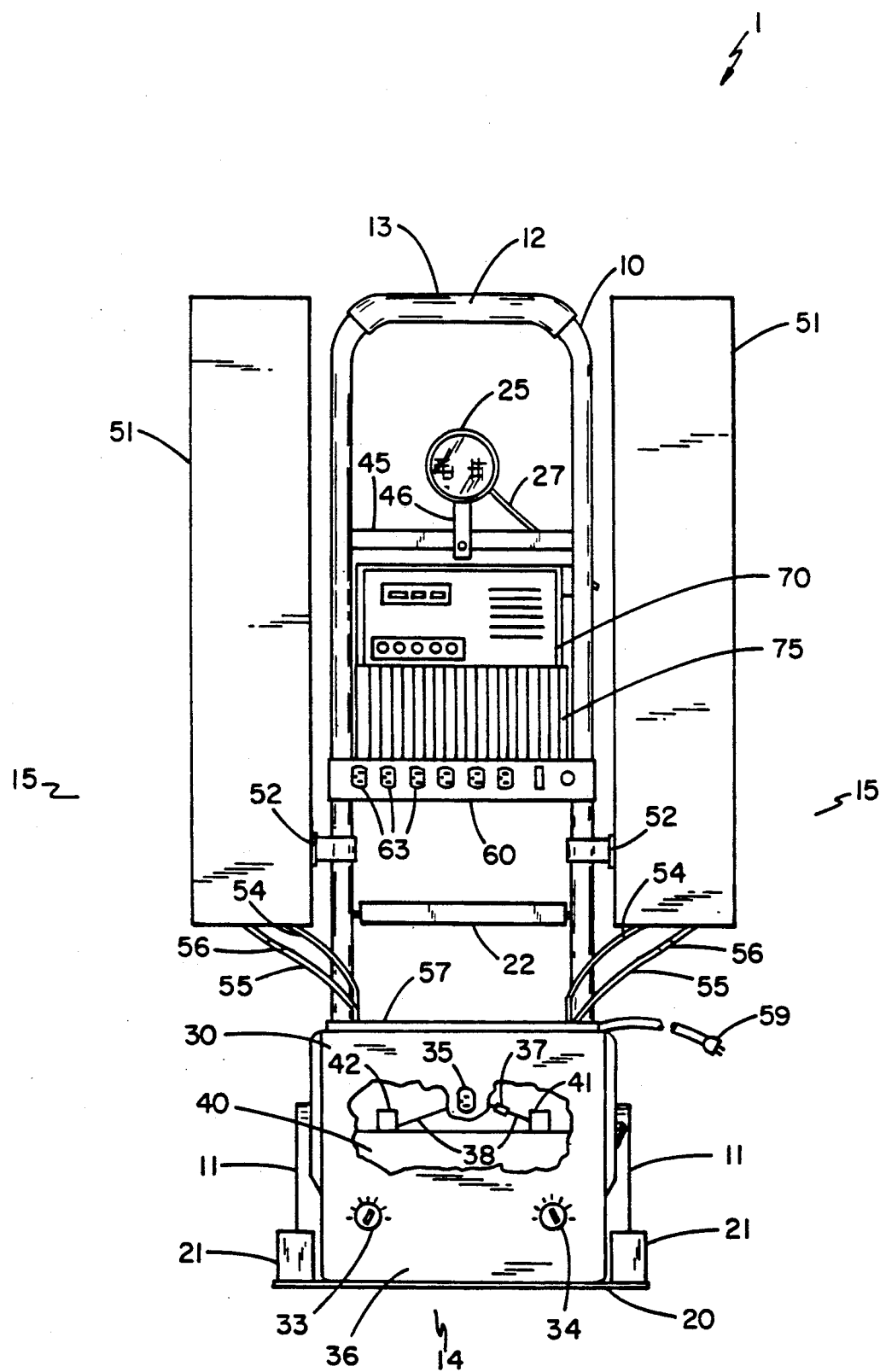
FIG. 2 is a front elevational view of the present invention.
Figure 3:
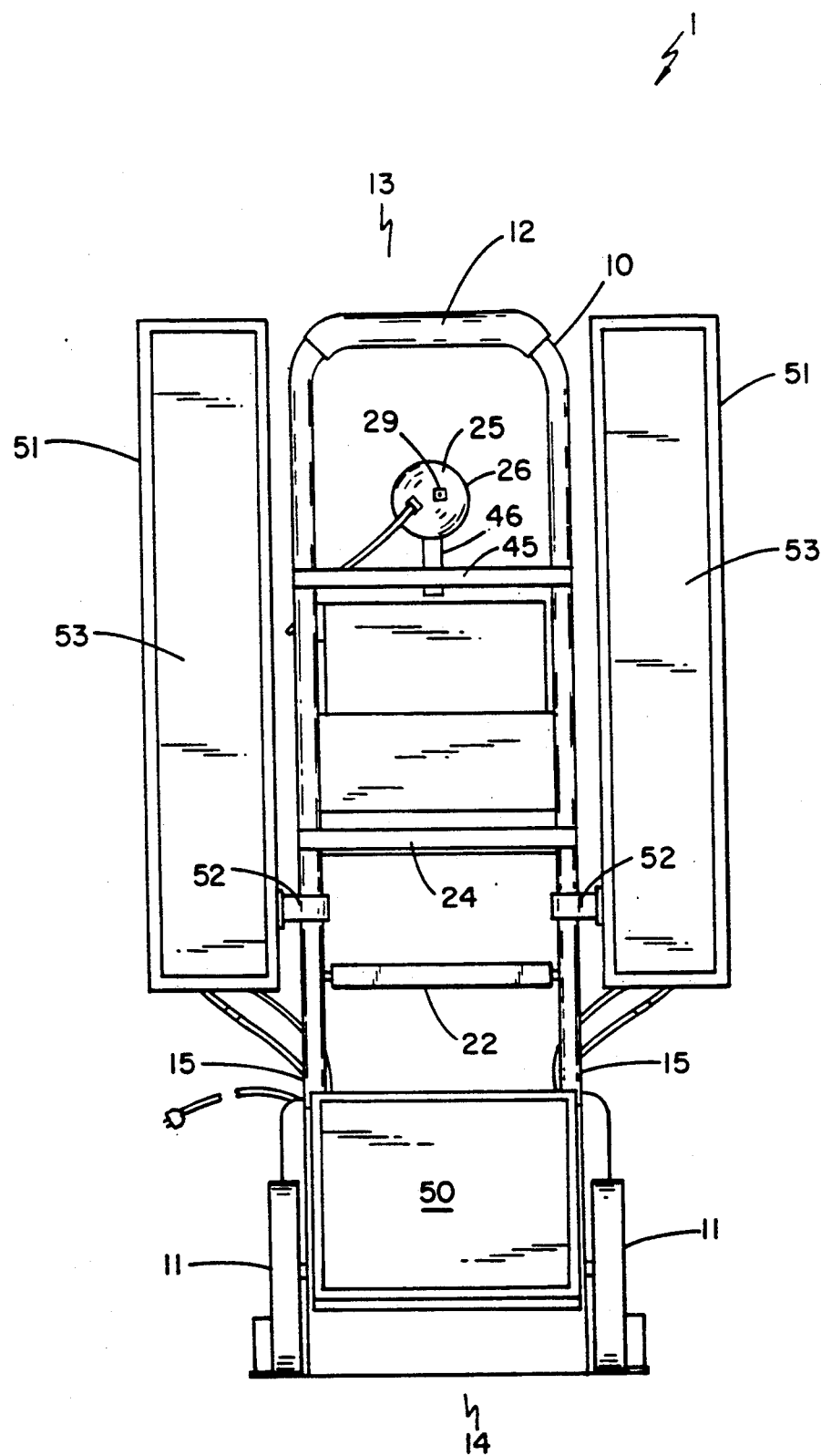
FIG. 3 is a rear elevational view thereof.
Figure 4:
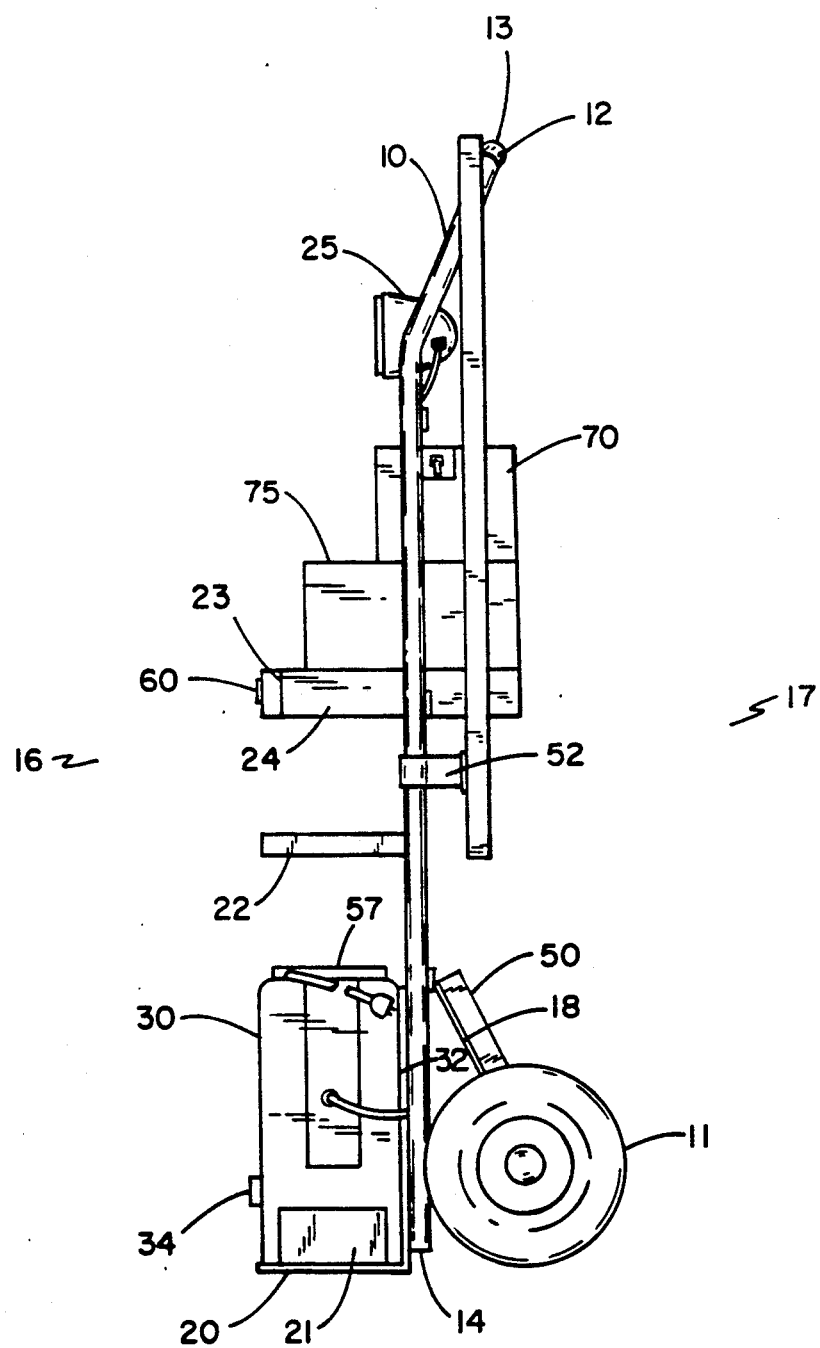
FIG. 4 is a side elevational view thereof.
Figure 5:
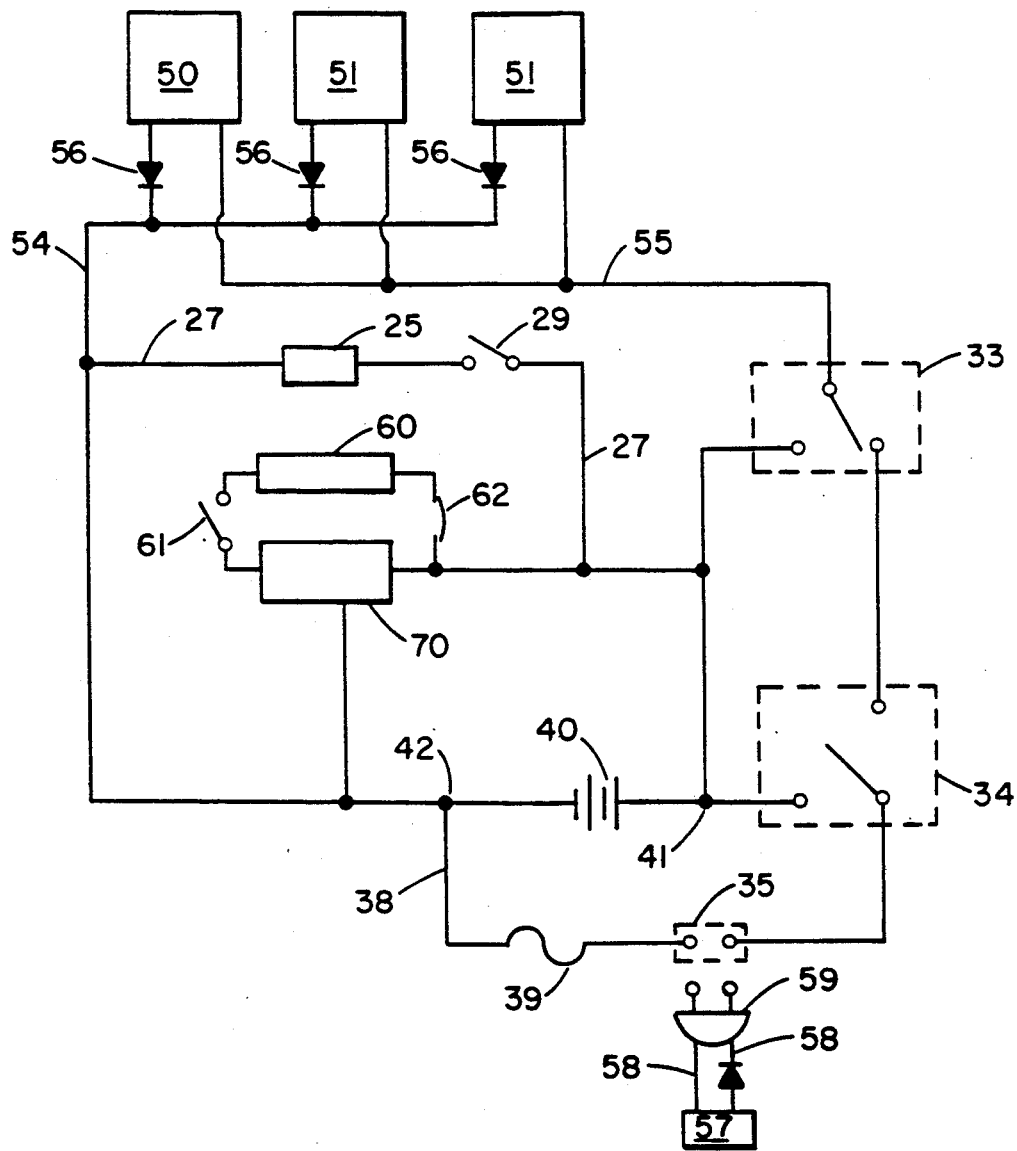
FIG. 5 is a schematic diagram describing the key electrical elements of the invention.

Just above the AC shelf 24 a 12 volt DC spotlight 25 is mounted to the frame 10 by means of a horizontal bracket 45 attached at either end to a frame side 15. An optional vertical extender bracket 46 attached to the horizontal bracket 45 may be used to raise the spotlight 25 further (see FIGS. 2-4). The spotlight 25 is connected by means of a double lead cable 27 to the battery 40. A spotlight on-off switch 29 is mounted on the spotlight rear 26.

Four photoelectric panels 50, 51, 57 are also included in this invention. A small (5 watt) panel 50 is positioned to the rear 32 of the battery box 30, rearward 17 of the frame 10, between the wheels 11, and attached to the brace 18. Two other larger (50 watt) panels 51 are attached to either side 15 of the frame 10 by means of a pivot joint 52 on each frame side 15. The panels 51 are typically treated as accessories which are snap fitted on after shipment. In operation, the two larger panels 51 are folded out from the frame sides 15 and the fronts 53 of the panels 51 are positioned to face rearward 17 or forward 16 of the frame 10. The pivot joints 52 also permit the side panels 51 to be pivoted between vertical and horizontal positions and set at any angle in between.

The smaller panel 50 and two larger panels 51 are connected to a first switch 33 attached to the battery box 30. This first switch 33 permits the panels' 50 and 51 output to be switched either to the battery 40 for recharging or to the second switch 34 also attached to the battery box 30. The second switch 34 determines whether electrical power for the DC plug 35 is to be from the battery 40 or from the three photovoltaic panels 50 and 51. One of the leads 54 or 55 from each panel 50 and 51 contains a one-way diode 56 to protect a given panel from the battery 40.

A small photovoltaic panel 57 is attached to the top 39 of the battery housing box 30. The panel output cable 58 is wired directly to a male plug 59. The purpose of the small panel 57 is to trickle charge the battery 40. When trickle charging is desired, the male plug 59 is inserted into the 12 volt DC female plug 35. The panel cable 58 also contains a one-way diode to prevent damage to the panel 57 from the battery 40.

The inverter 70 is wired directly to the battery 40. The inverter 70 converts DC power from the battery 40 into usable AC power. The inverter 70 in this embodiment is rated at 1200 watts. The inverter 70 may also be used to charge the battery 40 from an external AC source. When charging from an external AC source, the battery 40 will typically recharge in 15 minutes. Battery charging from the solar panels 50 and 51 will take approximately 2 hours.

A 6-outlet power block 60 is connected to the inverter 70 and provides the means for distributing the inverter AC output. The power block 60 has a lighted on-off switch 61 and a 15 amp circuit breaker 62. The switch 61 provides means for shutting off the power block 60. Each outlet 63 in the power block 60 provides 110-120 volt AC output.

In routine operation, the invention will power a TV, radio, cellular telephone, house lights and small appliances. It does not, however, have the power resources to operate heaters, large AC compressors, large AC pumps, and the like.

It is understood that the above-described embodiment is merely illustrative of the application. Other embodiments may be readily devised by those skilled in the art which will embody the principles of the invention and fall within the spirit and scope thereof.

I claim:

1. A portable, rechargeable power supply, comprising:
    a frame member;
    a plurality of ground engaging wheels attached to said frame member for transporting said frame member over the ground;
    a housing attached to said frame;
    a rechargeable DC battery located within said housing and having a positive and a negative output terminal;
    a voltage inverter, attached to said frame member and electrically hardwired to said battery output terminals, for converting DC output from said battery to an AC output and for converting AC power from an external source to a DC output for charging the DC battery;
    an AC power block mounted on said frame and electrically connected to said inverter and having a plurality of AC input/output sockets;
    a DC input/output female-type socket mounted on said housing and switchably connected electrically to said battery;
    a plurality of photovoltaic panels attached to said frame for generating DC electrical output from solar energy; and
    switching means mounted on said housing including a first switch for enabling the panels' DC output to be switched either to the battery for recharging or to a second switch, said second switch enabling the DC input/output socket to be electrically connected to either the battery or to said panels.

2. The portable, rechargeable power supply of claim 1 further comprising:
    a spotlight mounted to said frame and electrically connected to said battery.

3. The portable, rechargeable power supply of claim 2 further comprising:
    a DC male plug for insertion into said DC input/output female-type socket; and
    a small photovoltaic panel mounted on said housing and having an output cable wired directly to said DC male plug.

4. The portable, rechargeable power supply of claim 3 wherein:
    said power block has a lighted on-off switch and a circuit breaker in the electrical connection between the block and said inverter.

5. The portable, rechargeable power supply of claim 4 wherein:
    said frame member has an upright, dolly-shape, and a top, bottom, two sides, front and back.

6. The portable, rechargeable power supply of claim 5 wherein:
    said frame member has a shelf attached to its front near to its bottom upon which said battery housing rests.

7. The portable, rechargeable power supply of claim 6 wherein:
    said spotlight has an on-off switch mounted on its rear side and said spot light is attached to said frame member front near to its top.

8. The portable, rechargeable power supply of claim 7 wherein:
    two of said plurality of photovoltaic panels are attached one each to a frame member side by means of a pivot joint whereby each of said panels are folded out from the frame sides and are positioned to face rearward or forward of the frame.

9. The portable, rechargeable power supply of claim 8 wherein:
    said pivot joints permit said side connected panels to be pivoted between vertical and horizontal positions and set at any angle in between.

* * * * *